UNITED STATES PATENT OFFICE.

ARNOLD CORTI, OF DÜBENDORF, SWITZERLAND.

PROCESS OF MAKING CELLULOSE ACETATE.

No. 826,229.

Specification of Letters Patent.

Patented July 17, 1906.

Application filed May 20, 1905. Serial No. 261,420. (Specimens.)

*To all whom it may concern:*

Be it known that I, ARNOLD CORTI, a citizen of the Republic of Switzerland, residing in Dübendorf, near Zurich, in the Canton of Zurich, Republic of Switzerland, (whose post-office address is Dübendorf, near Zurich,) have invented a certain new and useful Process of Making Cellulose Acetate; and I do hereby declare the following to be a full, clear, and exact description of the invention, such as will enable others skilled in the art to which it appertains to make and use the same.

I have applied for patent in the following countries: in France on August 23, 1904; in Germany on August 24, 1904; in Belgium on April 15, 1905, and in Italy on April 17, 1905.

Heretofore the manufacture of cellulose acetates has only been possible by forming first from cotton or cellulose, with the aid of condensation agents, an intermediate product, and then transforming this intermediate product into cellulose acetate. These condensation agents were either concentrated mineral acids, such as sulfuric acid (*c. f.* French Patent No. 317,007 and Addition No. 1,425) and phosphoric acid (French Patent No. 316,500) or acetate of zinc or magnesium, (German Patents Nos. 85,329 and 86,368.) Processes are also known according to which the cellulose is first transformed into hydrocellulose, which is then transformed into acetate of cellulose by means of mineral acids, (German Patent No. 118,538, French Patent No. 319,848, United States Patent No. 733,729.)

I have now discovered that cellulose acetates can be made directly by means of cotton or of cellulose almost of the amount theoretically obtainable without the presence of mineral acids if instead of acids dimethyl sulfate is employed. According to the quantity of dimethyl sulfate used, acetates of different properties may be obtained. Thus, for example, one can heat in a bath thirty parts of cotton or cellulose with seventy parts of acetic-acid anhydrid, one hundred and twenty parts of glacial acetic acid, and three parts of dimethyl sulfate till dissolution is almost complete. The solution is filtered and the filtrate is poured into a large quantity of water, whereupon the acetate precipitates in a form corresponding to tetracetate of cellulose. The product so obtained is soluble in acetic acid, chloroform, acetone, and insoluble in alcohol and ether. During the operation the temperature may reach 130°.

If in the preceding example the three parts of dimethyl sulfate are replaced by about fifteen or more parts the production into acetate is not so good and a product is obtained which is soluble in acetic acid, chloroform, acetone, and alcohol.

For preparing acetate of cellulose by this process either pure dimethyl sulfate freshly distilled or commercial dimethyl sulfate may be employed.

What I claim is—

1. A process for producing cellulose acetate, which consists in subjecting cellulose to the action of acetic acid, actic-acid anhydrid and dimethyl sulfate, and to heat.

2. A process for producing cellulose acetate, which consists in subjecting cellulose to the action of acetic acid, acetic-acid anhydrid and dimethyl sulfate.

3. A process for producing cellulose acetate, which consists in subjecting cellulose to the action of a mixture containing dimethyl sulfate, acetic-acid anhydrid and acetic acid, the quantities of acetic-acid anhydrid and acetic acid being in the ratio of seventy to one hundred and twenty.

4. A process for producing cellulose acetate, which consists in subjecting cellulose to the action of a mixture containing acetic-acid anhydrid, acetic acid and dimethyl sulfate; filtering the solution thus obtained and pouring the filtrate into water, and permitting the acetate to precipitate.

In testimony whereof I have signed my name to this specification in the presence of two subscribing witnesses.

ARNOLD CORTI.

Witnesses:
 HERMANN HUBER,
 A. LIEBERKNECHT.